UNITED STATES PATENT OFFICE.

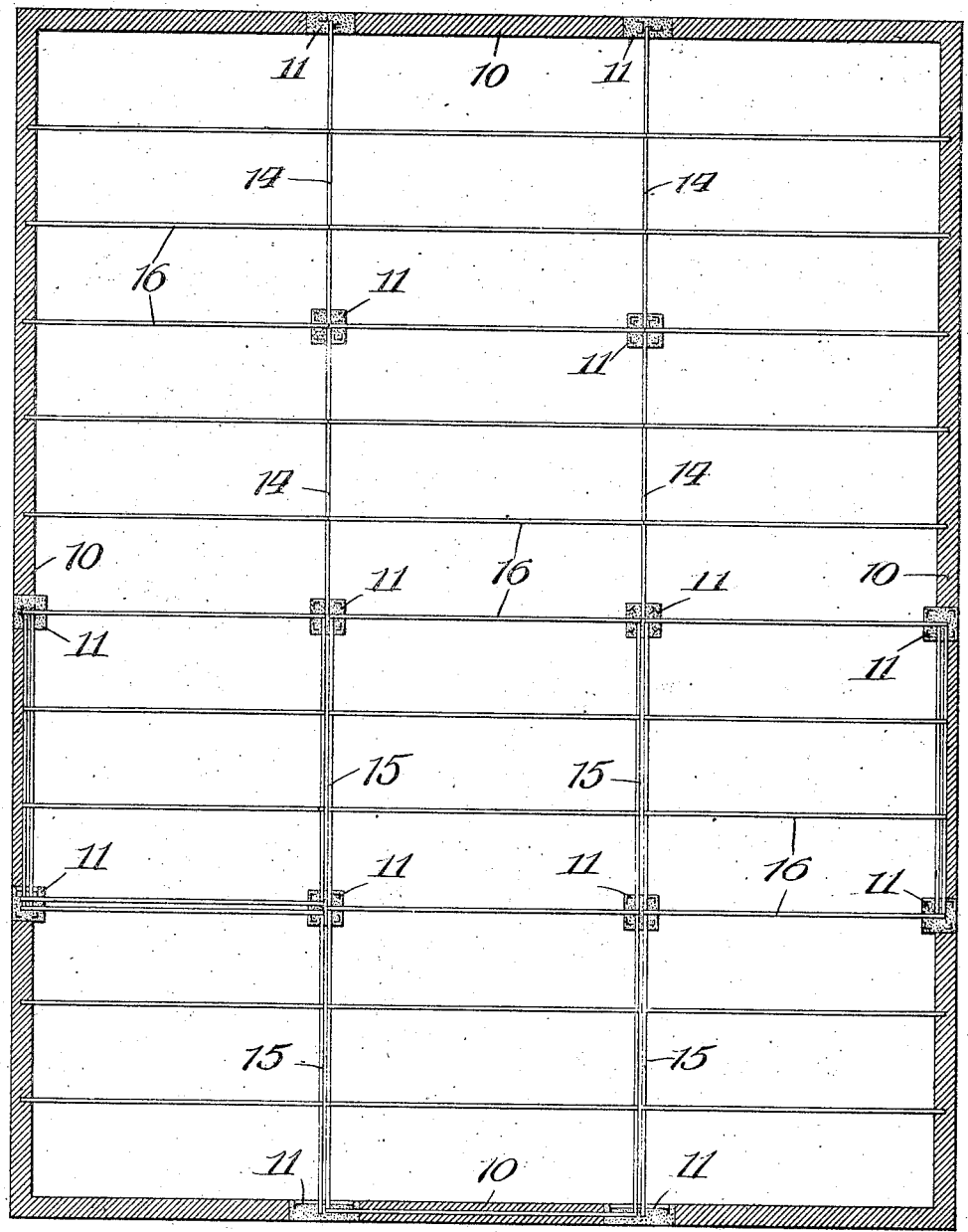

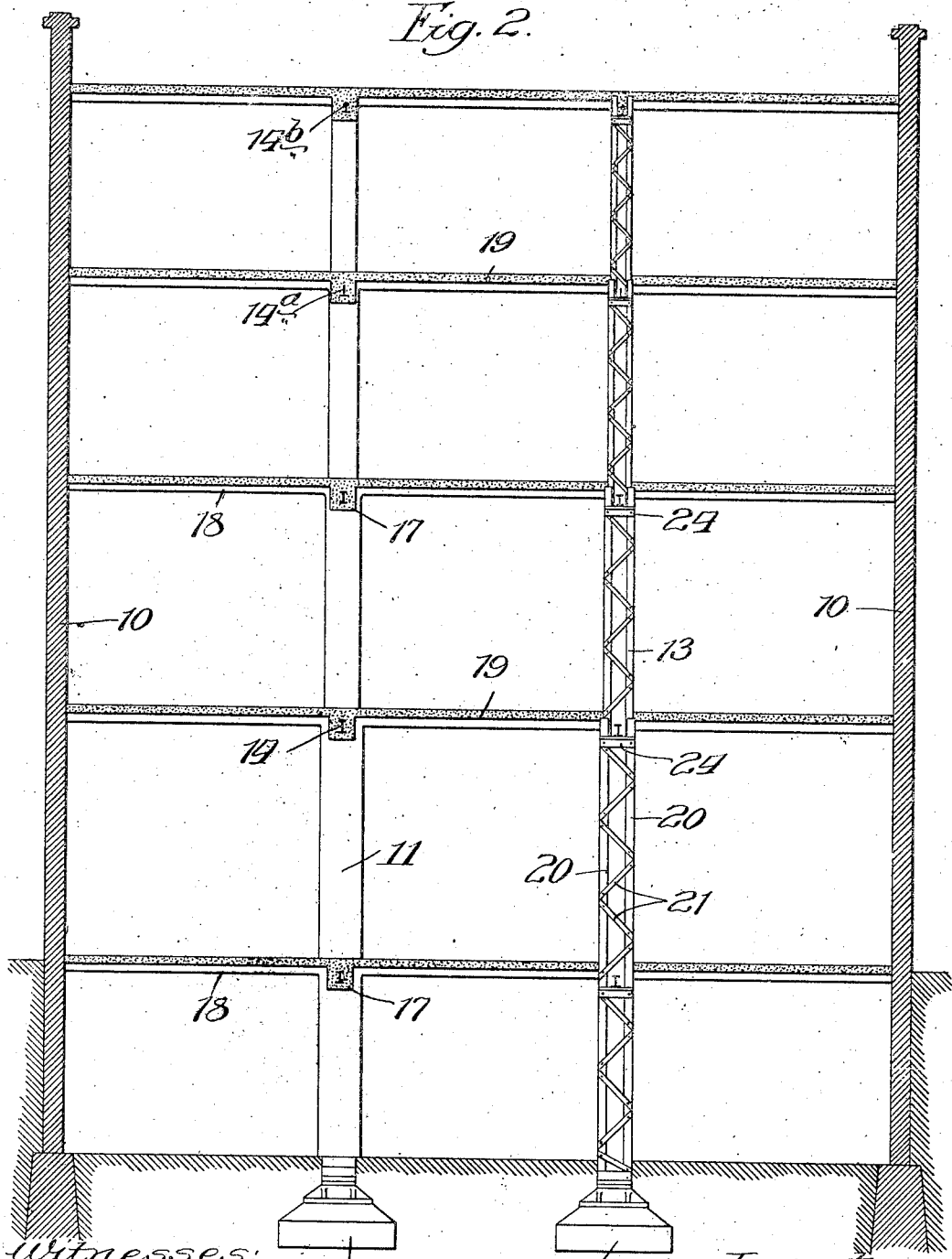

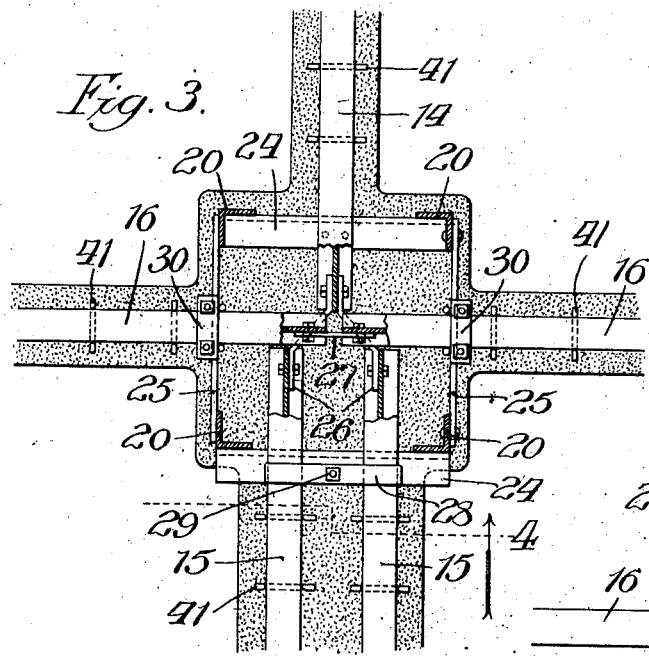
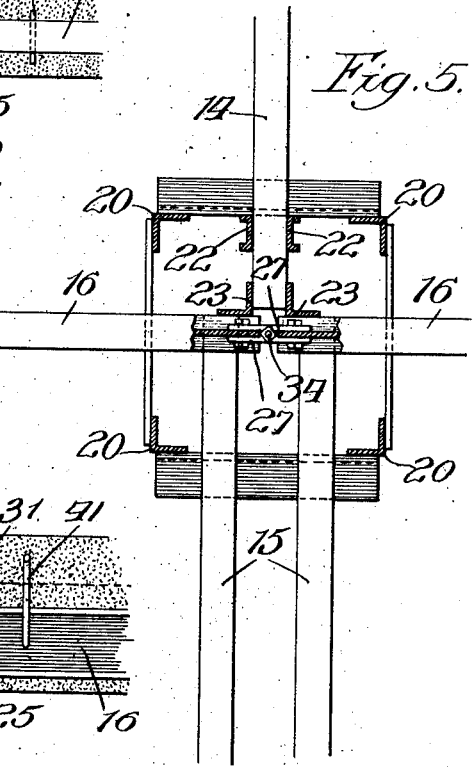
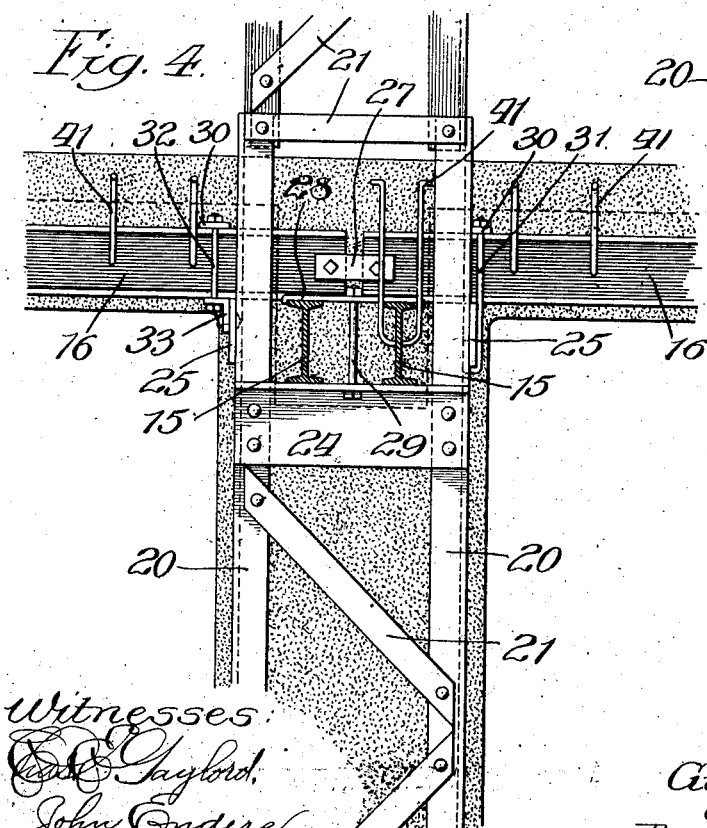

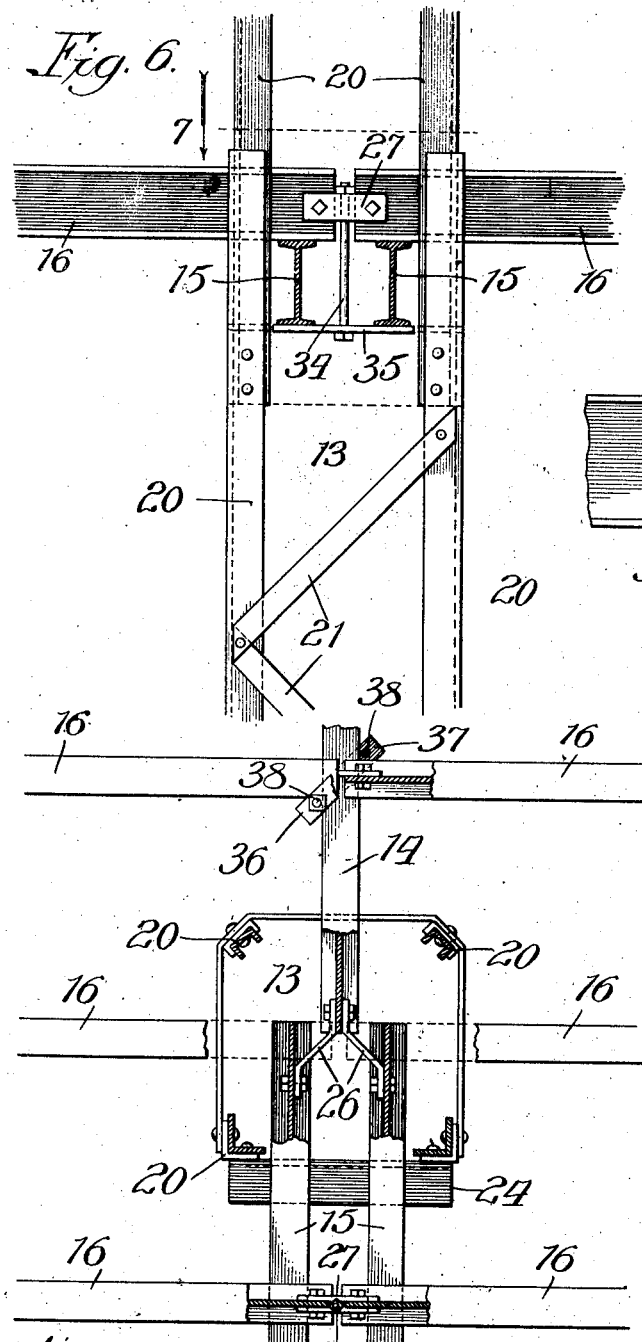

GUY B. WAITE, OF NEW YORK, N. Y.

FIREPROOF-BUILDING CONSTRUCTION.

1,099,953.

Specification of Letters Patent. Patented June 16, 1914.

Application filed October 26, 1906. Serial No. 340,703.

*To all whom it may concern:*

Be it known that I, GUY B. WAITE, a citizen of the United States, residing in city, county, and State of New York, have invented certain new and useful Improvements in Fireproof-Building Constructions, of which the following is a specification.

This invention relates to the subject of fire-proof buildings.

For several years past the most important fire-proof buildings, especially in large cities, have been constructed with a steel skeleton filled in between and around the steel with fire-proof materials. The steel skeleton has furnished the factor of strength, the steel being designed to carry the entire load; the fire-proofing being a protection and filler for the steel work. More recently steel reinforcement to concrete for building construction has been introduced, in which construction steel bars or rods are incorporated into a concrete mass, the steel forming a small percentage only of the entire structural work. In the former mode or style of construction the steel work is carefully and accurately designed and detailed so that the parts of the steel structure shall fit exactly together and the whole can be erected to independently carry and transmit loads from one part of the structure to the other. In the latter construction the concrete and steel must be united to sustain and transmit the loads from one part of the structure to the other.

The mode of procedure in the erection of the steel skeleton construction is to first proceed with the erection of the steel work which is thoroughly tied and braced. When the steel has been correctly set for several stories in height (so as to be out of the way of other work) the fire-proofing and other work is installed, and follows the erection of the steel frame. The mode of procedure in the erection of reinforced concrete buildings differs from that of the steel skeleton type in that all parts of the construction have to be plumbed and supported by false-work and all parts of the construction have to go into the false-work simultaneously to be united.

In cities where space for false-work, necessary in bar reinforced concrete construction, is difficult to get, and where rapid construction is demanded, the steel skeleton construction has decided advantages over the bar reinforced concrete in the following particulars: (*a*) The steel uprights are plumbed and set quickly and immediately offer a safe support. (*b*) The beams and girders connected to the uprights can be rigidly fastened and proper braces used to make a stiff skeleton capable of carrying loads immediately. (*c*) Floor and wall filling can be put in independently of each other at the same time that the erection of the steel is proceeding above. On the other hand, in the case of concrete reinforced with rods or bars, under present practice the entire construction must be put in at one time in order to give a monolithic mass;—neither the steel nor the concrete can proceed independently. The erection of the necessary false-work, the subsequent running in of the concrete and steel at the same time, and the necessity of waiting for the hardening of the concrete before proceeding with the next story, especially in inclement and freezing weather, are very serious defects at present in this form of construction.

The object of this invention is to produce a construction of steel and concrete which shall have all the advantages possessed by the steel skeleton construction in respect to (*a*) safety and rapidity of erection, (*b*) independence in the erection of steel and concrete, (*c*) the production of strength and stiffness without the exact and careful detailing of steel and the expensive setting of the same necessary in the steel skeleton construction where every part must fit exactly and all bolts and rivets must be tight, (*d*) giving the lines and levels for guiding the concrete construction which is to follow the preliminary steel, and (*e*) giving the support for the scaffolding, etc.; and, in addition to having the above advantages in common with the steel skeleton construction, also to have the economy of the concrete construction.

In my present construction the steel used in the upright supports is preferably of the open latticed type, temporarily supported on and through which the steel floor members extend. Sufficient steel is used in these uprights to enable the light steel work to be carried up a suitable distance ahead of the other work, the amount of such steel being determined to suit the conditions and to carry such loads as are necessary until the concrete is hardened. When the steel work has been advanced sufficiently, the hollow uprights are packed with concrete, which latter forms a principal part of the carrying member after it becomes hard. The steel in the uprights, besides carrying temporary loads, embraces the concrete and strengthens the same.

According to my construction the steel ribs of the uprights are plumbed, and the steel floor members are laid across and temporarily supported on shelves or brackets secured to said uprights. Suitable clamps hold the floor members to the steel of the uprights. When the concrete is run into the upright, between the steel ribs thereof, it goes around the ends of the floor members which project inside the upright embedding said floor members and forming a stiff connection equivalent to the best riveted connection of the steel skeleton construction. The beams do not have to be exact in length or exactly punched, as in riveted steel work, since the concrete effects a perfect connection.

The steel floor members are small I-beams, or other light rigid structural steel members of standard commercial shapes capable of holding themselves in straight lines and stiff enough to brace the temporary structure and support necessary scaffolding to allow the steel to proceed ahead of the concrete. The small steel floor members are so located that they will act ultimately as tension members to the concrete, and, with the latter constitute a reinforced concrete construction, shear-resisting strips or bars being also preferably included; but until the concrete is hardened the steel acts independently and helps to carry the temporary load.

In the accompanying drawings I have sought to illustrate some detail forms of construction which may advantageously be employed in carrying out the same; and referring thereto—

Figure 1 is a general plan view, with the uprights and side walls appearing in cross-section; Fig. 2 is a vertical section of Fig. 1, said figure also showing the concrete beam and floor filling as partly installed; Fig. 3 is an enlarged horizontal section through one of the uprights of Figs. 1 and 2; Fig. 4 is a detail view in vertical section on the line 4 of Fig. 3; Fig. 5 is a view similar to Fig. 3, illustrating variations which can be made in the design of the steel uprights; and Figs. 6, 7 and 8 are detail views, illustrating various means of temporarily connecting the floor-beams to each other and to the upright.

Referring first to Figs. 1 and 2, which show the general scheme or plan of my invention, 10 represents the outer or inclosing walls of the building, which may be of either brick or concrete. 11 designates each of a series of uprights or columns forming the vertical supports of the structure and stepped on pedestals 12 (Fig. 2). Each of these uprights or columns comprises a skeleton pillar or post designated as an entirety by 13 and formed by light steel bars of various commercial shapes disposed vertically and preferably spaced and connected by latticework, and a filling and covering of concrete. In Fig. 2 the naked steel structure of the column is shown at the right, while the completed column with its filling and covering of concrete is shown at the left. 14 and 15 designate light steel I-beam girders of single and twin formation, respectively, extending between and supported by the columns, which girders may be of other commerical forms, such as T-beams 14ª and deck-beams 14ᵇ (Fig. 2); and 16 designates light steel floor beams disposed transversely of and supported on the girders. It will be observed by reference to Figs. 3 to 7 as constituting a leading feature of my invention that the ends of the girders and of such of the floor beams as lie in the planes of the columns project into the latter so as to be embedded and firmly held in and by the concrete filling of said columns, such concrete filling effecting the permanent connection of the parts in the finished structure. The light steel girders and floor-beams constitute, in the finished structure, the steel reinforcement of the finished concrete girders and beams indicated at 17 and 18 respectively, in Fig. 2, wherein 19 indicates the finished concrete floors; and said steel floor members need be of sufficient weight and strength only to tie the light frame structure together and hold up scaffolding and other normal temporary or building loads. In case any heavy temporary weight is to be carried on these members before the concrete has been run in or set around them, temporary props may be placed beneath them.

Referring to the detail structure of the steel skeleton of the uprights or columns, it will be evident that this is capable of almost limitless variation, the essential thing being that the structure shall be open for the reception of the ends of the steel floor members and the concrete body or filling, and shall be sufficiently rigid to support the light steel flooring and permit the erection of the steel reinforcement in advance of the concrete. Preferably, and in the principal forms herein shown, each column is substantially rectangular in cross-section, although it may be of other forms, and comprises essentially four upright light steel bars 20, one at each of the four corners, connected by some form of lattice-work 21. These bars may be of any of the commercial forms, such as angles, channels, T's, etc., as illustrated in Fig. 1 and the detail views, Figs. 3 to 7; and in addition to or in lieu of the corner-bars any other combination or arrangement of supplemental steel may be employed as the load or other conditions may warrant, such supplemental or additional steel being shown by the channels 22 and angles 23 in Fig. 5. At intervals corresponding to the distance apart of the floors the corner-bars of the columns are additionally connected and tied together by horizontal plates or brackets, as shown at 24 and 25; which latter serve the principal function of supports for the ends of the steel floor girders and beams, respectively. The meeting ends of the steel girders and floor-beams may be temporarily tied together by any suitable means, such as the straps 26 and 27; and where the ends of said floor members engage the columns they are preferably clamped thereto.

By the expression "temporarily tied together," and like expressions used herein, I mean such a connection as suffices to unite and hold together the parts of the frame during the erection of the latter and the application of the concrete, the concrete itself forming the principal and permanent connecting agent, although the temporary connections are allowed to remain in the finished structure.

As shown in Figs. 3 and 4, the twin girders 15 may be clamped to bracket 24 by a clamp-plate 28 and central bolt 29; the floor-beams 16 may be clamped to the plates 25 by clamps 30 and hooked bolts 31 engaging beneath the lower edge of plate 25 or by straight bolts 32 anchored in a lower clamp member 33 riveted to the plate 25. Where the ends of the girders and floor-beams project into the column far enough to overlie one another, as shown in Figs. 5, 6 and 7, as also where the girders and floor-beams cross each other at points between the columns, they are preferably clamped together temporarily in order to insure sufficient rigidity to the steel frame to safely carry the temporary loading. This may be effected in a great variety of ways. Where the adjacent ends of two floor-beams overlie twin girders, as in Figs. 5, 6 and 7, a bolt 34 may be passed between the two tie-straps 27 and through a clamp-plate 35 underlying the girders. Where the adjacent ends of two floor-beams overlie a single girder, or where continuous portions of a floor-beam and girder cross each other, they may be conveniently tied together by obliquely disposed upper and lower clamps 36 and 37 united by side bolts 38 (Fig. 7).

Fig. 8 illustrates another means of connecting the intersecting steel floor-members, the same consisting simply of a pair of flat clamp-plates 39 adapted to overlie adjacent portions of the contacting lower and upper flanges of the beams and girders, respectively, and secured in place by short bolts 40 passed therethrough and through the lower flanges of the floor-beams.

As hereinabove stated the light steel girders and floor beams are designed and intended to serve as tensional reinforcement to the finished concrete girders and beams; and in this type of construction good practice recognizes the desirability of also incorporating into the steel-concrete beam or girder transversely disposed metal members that extend from the tension to the compression region and act to resist longitudinal and oblique shearing strains in the concrete. In Fig. 4 of the drawings I have shown such shear-resisting members in the form of U-bars 41 which pass through holes in the webs of the steel beams or may be otherwise connected thereto and extend upwardly across the neutral zone and into the compression region of the concrete.

It will be noticed particularly by reference to Figs. 3 and 4 that the ends of the light steel girders and floor-beams are embedded in the concrete forming the main body and covering of the columns and depend on this for ultimate security. Therefore, such girders and beams do not have to be precise in length, and do not have to have exact connection holes for riveting, etc., as would be required if the steel had to do all of the load-carrying and depend on the connections made. The setting of the steel in place is also much more simple and expeditious than is required where the connections must be more precise.

I have shown herein only a few ways and means for connecting the beams and girders together and to the steel of the uprights for the purpose of securing sufficient temporary strength and rigidity of the steel work to enable the erection of the latter to proceed independently and ahead of the concrete; and it will be evident to those skilled in this art that an almost indefinite number of other and equivalent details may be used all toward the same end.

For the running in and shaping of the concrete to form the finished walls, columns, beams, girders and flooring, suitable molds and centering forms are, of course, employed; but as these are old and in common use I have not deemed it necessary to illustrate or describe them herein. They are put in place and the concrete run in as the steel work proceeds, but sufficiently behind the latter not to present any interference therewith.

It is believed that the foregoing description, taken in connection with the accompanying drawings showing typical examples of construction, will make clear to those skilled in the art of fire-proof building the novel manner of erecting reinforced concrete building structures underlying my present invention, whereby, as above stated, I am enabled to combine all the advantages of the standard steel skeleton construction with the economy of the reinforced concrete construction.

I am aware that it has heretofore been proposed to erect a reinforced concrete building by erecting a metal frame of tubes and pipes united by screw-threaded couplings and suitably braced and applying a filling and covering of cement or concrete thereto; also by independently molding concrete columns, girders and floor beams around metal reinforcing members consisting of upright tubes or pipes in the columns and horizontal trussed tubes or pipes in the girders and floor beams; and subsequently assembling and uniting such reinforced concrete members into a building structure.

I am also aware that it is old, in metal-concrete elevator bins, to employ skeleton metal columns filled and surrounded by concrete, with concrete side walls reinforced by laterally-bowed metal rods hooked at their ends into the upright members of the skeleton columns, and with concrete bottoms tensionally reinforced by interlaced bent suspension bars embedded therein.

Furthermore, I am aware that the use of lattice-work, associated with promiscuous longitudinal bars and rods and forming loops, ties and struts for the latter, as an element of a concrete reinforcing framework, is old and known.

My present invention inheres in none of these, but rather in a building construction involving a reinforcement of light framed steel beams of standard rolled shapes hereinabove described and distinguished from known modes and forms of reinforced concrete construction.

What, therefore, I claim and desire to secure by Letters Patent is—

1. A monolithic multi-story reinforced-concrete structure consisting of a series of concrete columns each reinforced by an embedded skeleton steel structure and a series of concrete floor structures each being reinforced by steel girders whose ends extend into and terminate within the skeleton steel structures in the columns and also by steel floor-beams whose ends are supported upon said girders, those floor-beams which are in the planes of the columns having their ends extended into and terminated in the skeleton steel structures in the columns, whereby the reinforcing girders and floor-beams are tied together by the masses of concrete in the columns.

2. In a multi-story reinforced concrete building structure embodying continuously cast integral columns and floor slabs, a reinforcing frame of steel comprising a series of column reinforcements and floor reinforcing frames, the members of said floor reinforcing frames all being located below the neutral axes of the respective floor slabs in which they lie, and which are directly and continuously connected to each other throughout the entire area of each of said reinforcing frames of each floor and are additionally directly and rigidly connected to the reinforcement of each supporting column, whereby a continuous reinforcing frame of great lightness and unusual rigidity is produced capable when fully erected of withstanding alone all ordinary loads of men, material and scaffolding used during construction.

In testimony that I claim the foregoing as my invention I have hereunto subscribed my name in the presence of two witnesses.

GUY B. WAITE.

Witnesses:
JESSE GRANT ROE,
LEONARD I. ROE.